Patented Jan. 9, 1940

2,186,101

UNITED STATES PATENT OFFICE 2,186,101

PRODUCTION OF CELLULOSIC MATERIALS

Henry Dreyfus, London, England

No Drawing. Application November 26, 1937, Serial No. 176,659. In Great Britain December 3, 1936

9 Claims. (Cl. 260—212)

This invention relates to improvements in the production of cellulosic materials, and particularly to the production of cellulosic materials containing non-acidic nitrogen.

In specification No. 1,986,881, I have described the manufacture of nitrogen-containing cellulose derivatives by introducing nitrogen into cellulose or cellulose derivatives by treatment with organic bases. I have now discovered that the introduction of non-acidic nitrogen into cellulose or cellulose derivative materials can be facilitated by the use of catalysts, and according to the present invention, therefore cellulose derivative materials containing non-acidic nitrogen are produced by reacting cellulose or cellulose derivatives with ammonia or organic nitrogen-containing compounds in the presence of metals or metal compounds as catalysts. By this means products containing considerable proportions of combined nitrogen, for example a proportion of nitrogen of the order of 5–10 or 15% or more, may be obtained in a comparatively simple manner.

It is to be understood that the expression "non-acidic nitrogen" excludes nitrogen in the form of nitro groups.

The cellulose or cellulose derivative materials treated for the introduction of non-action nitrogen may be of any nature. Thus natural cellulose materials, e. g. cotton linters or chemical or mechanical wood pulps may be employed. Such materials may be pretreated in order to increase their activity, for example with hydrochloric or other hydrohalide acid, or with formic acid or other organic acids, for example as described in my Specifications Nos. 1,708,787; 1,857,183 and 1,831,101 and my French Specification No. 565,654. Organic acids employed for pretreatment may contain small proportions of sulphuric acid or other inorganic acidic compounds which increase the reactivity of the materials but if such compounds are employed they should be removed from the materials before they are reacted with the nitrogen-containing reagent. Wood pulps may be pretreated according to the process described in my Specification No. 1,711,110.

Regenerated cellulose materials may also be treated according to this invention and such materials may be obtained in any suitable manner, e. g. from a solution of sodium cellulose xanthate or other cellulose xanthate, a cuprammonium solution of cellulose or a solution of cellulose in zinc chloride or other suitable substance. Regenerated cellulose materials may also be obtained by the decomposition of relatively stable cellulose derivatives, for example by the saponification of cellulose acetate and other organic esters of cellulose by the action of organic or inorganic bases, or by the treatment of nitrocellulose with ammonium sulphide.

Cellulose derivative materials treated according to this invention preferably contain hydroxy groups in the cellulose nucleus and/or in substituent radicles, or contain unsaturated groups in substituent radicles. Cellulose derivatives which contain both hydroxy groups and unsaturated groups may also be employed. Hydroxy groups in substituent radicles may be alcoholic hydroxy groups or may be in the form of carboxyl groups; hydroxy groups of both types may be present. Cellulose derivatives which do not contain hydroxy groups or unsaturated groups may also be treated, but in this case the conditions of the treatment should be such that hydroxy groups are initially produced. Thus, for example, cellulose triacetate may be treated under reaction conditions which cause at least partial saponification of the acetate groups, thus leaving residual nuclear hydroxy groups. Suitable cellulose derivatives for treatment according to the present invention are, for example, cellulose acetate, propionate, butyrate, crotonate, nitro-acetate, glycollate, acetate-glycollate, succinate, phthalate and other organic esters and mixed esters of cellulose, partially etherified celluloses, e. g. methyl, ethyl, propyl, butyl and other ethers and mixed ethers of cellulose containing less than three ether groups per cellulose molecule, ethers of cellulose containing hydroxy, carboxy or unsaturated groups in the ether radicles, e. g. vinyl, allyl, styryl, oxy-ethyl and ethyl oxy-ethyl celluloses and cellulose glycollic acid, and ether-esters of cellulose, for example ethyl cellulose acetate and oxy-ethyl cellulose acetate. Cellulose acetate employed as a starting material for the process of the present invention may be obtained by any suitable process, e. g. by acetylating cotton linters or wood pulp with acetic anhydride in the presence of acetic acid using sulphuric acid or zinc chloride as catalyst. As indicated above, it may be a primary cellulose acetate containing approximately three acetyl groups for each $C_6H_{10}O_5$ group, but preferably it is an acetate containing a smaller proportion of acetyl groups, for example ordinary commercial acetone-soluble cellulose acetate.

The cellulose or cellulose derivative materials may be treated in any suitable state. In the case of natural cellulose materials, for example, they may be, as indicated above, in the form of cotton linters or wood pulp or they may be in the form of articles of commerce, e. g. in the form of yarns of cotton, linen or hemp, or in the form of paper. Regenerated cellulose and cellulose derivative materials may be treated, for example, in the form of powders, granules or flakes. Thus, cellulose derivatives may be treated in the form in which they are obtained by precipitation from a primary or secondary esterification solution or in the form in which they are obtained after esterification in suspension, or in the form in which they are obtained from an etherification mixture. Cellulose derivatives which have been dissolved subsequent to their production, e. g. in acetone, and then precipitated may also be treated in the precipitated condition. Alternatively, cellulose and cellulose derivative materials may be treated in the form of artificial filaments, yarns, films, foils and similar materials the conditions of the treatment being such that the form of the materials is not destroyed. Cellulose derivative materials may also be treated in the form in which they are obtained by the esterification or etherification of natural cellulose yarns or similar materials or regenerated cellulose filaments, yarns, films, foils and the like, e. g. in the form of effect threads obtained by the partial acetylation of cotton threads.

Filaments, yarns and similar materials may be treated, in accordance with the present invention, in the form of hanks, on bobbins and in cakes or other suitable packages. Bobbins, cakes and the like to be treated are preferably wound with a quick traverse under relatively low tension so as to facilitate penetration by the reagents. Yarns and the like may also be treated after association to form fabrics or other materials.

A large number of nitrogen-containing substances are available for carrying out the reaction according to the process of the present invention. For example the cellulosic materials may be reacted with ammonia, either in a gaseous or liquid state, or with a primary, secondary or tertiary alkylamine or substitution derivative thereof, for example mono- or di-methylamine or mono- or di-ethylamine, mono- or di-ethanolamine or other alkylolamine. Aliphatic amines containing two or more amino groups and substitution derivatives thereof may also be employed, ethylene diamine being a substance of this class which has been found to be particularly suitable. Acid amides and derivatives of amino acids, for example acetamide, amino-acetic acid nitrile and ammonium and ethyl carbamates may be employed, as may also urea, thiourea and derivatives thereof, for example the diethyl ureas. Cyclic nitrogen-containing compounds may also be employed including heterocyclic compounds, e. g. piperidine, cyclo-aliphatic compounds containing nitrogen in substituent groups, for example cyclohexylamine, and aromatic compounds, for example aniline and the phenylene diamines.

The nitrogen-containing compound employed may be the sole substance present during the reaction, apart from the catalyst and the cellulose or cellulose derivative materials, or other substances may also be present, for example gaseous or liquid diluents. Thus an organic base, in liquid or gaseous form, may be circulated through cellulose or cellulose derivative materials containing a suitable catalyst, or it may be dissolved in a suitable liquid, for example alcohol, or mixed with a gas, for example nitrogen, and employed under these conditions. Alcohols, for example anhydrous methyl or ethyl alcohol or methylated spirit, have been found to be very suitable diluents, while among other diluents which may be employed may be mentioned benzene, toluene, kerosene, tetrahydronaphthalene, decahydronaphthalene and other hydrocarbons, acetone, dioxane, and the higher ethers, for example di-isopropyl ether and dibutyl and diamyl ethers. The reaction may be carried out in a liquid medium which is a solvent for the cellulose derivative produced.

Numerous metals and metallic compounds have been found to act as catalysts in the reaction between the cellulose and cellulose derivative materials and the nitrogen-containing compounds. One class of compounds which has been found to yield very good results is that consisting of the metals and compounds thereof which are capable of forming amines or like complex or co-ordination compounds containing nitrogen, especially complex or co-ordination compounds which are derived from ammonia or organically substituted ammonias and which are salts or bases and can ionise yielding on the one hand an acidic ion or hydroxyl ion as the case may be, and on the other hand a complex ion containing both metal and nitrogen. Of particular value are salts of manganese, copper and platinum, for example manganese sulphate and chloride, platinic chloride and copper sulphate. Metals themselves in a finely divided state may also be employed, for example metallic nickel, iron and copper. Other suitable substances are oxides and hydrated oxides, particularly thorium oxide, tungstic oxide and alumina, zinc chloride, and metal phosphates. When a substance forming a nitrogenous complex is employed as catalyst, it may be introduced into the medium or the materials either in the uncombined form or as a nitrogenous complex, preferably a nitrogenous complex comprising the nitrogen-containing substance which is to be reacted with the materials.

The catalyst may be present either in the medium comprising the nitrogen-containing reactant, or in the cellulose or cellulose derivative materials themselves. For example a medium containing the nitrogen-containing reactant and a suitable catalyst in solution or in finely divided or colloidal form, for example manganese sulphate, nickel or copper, may be circulated through the cellulose or cellulose derivative materials. Alternatively, the materials may be impregnated with the catalyst, for example by soaking them in a solution of the catalyst, and subsequently drying if necessary, or by introducing them into a medium containing a substance yielding the catalyst or a component thereof and precipitating the catalyst in the materials from the medium, for example by decomposition or double decomposition. Thus the materials may be impregnated with a solution of nickel carbonyl in alcohol or an alcohol-benzene mixture, and the carbonyl may then be decomposed by heating the materials to 150–180° C. in a closed vessel in an atmosphere of the carbonyl. The decomposition and reaction with the nitrogen containing reagent may be effected in a single operation. For example, materials impregnated with nickel carbonyl may be heated to 150–180° C. in liquid ethylene diamine under pressure until the desired degree of substitution is effected. When the formation of the catalyst in the materials involves the introduction or formation of other substances, such substances may be removed by a suitable treatment of the materials, e. g. washing.

In general it is unnecessary to use large quantities of the catalysts, and it is sufficient to employ proportions of about ½ to 1 or 2% based on the weight of the cellulose or cellulose derivative materials, though higher proportions may if desired be employed. The proportion of nitrogen-containing reactant may be comparatively low, for example of the order of 2 or 3 molecular proportions for each hydroxy or unsaturated group which it is desired to substitute or saturate in the materials, or considerably higher proportions may be employed, particularly if the reaction is carried out in the absence of a diluent.

In order to accelerate the reaction it is preferably carried out at super-atmospheric temperature and pressure, for example at a temperature of 100 to 150° C. or even more and under a pressure of 10 to 20 up to 50 atmospheres or more. The duration of the reaction will, of course, depend upon the other conditions prevailing, including the nature of the catalyst and of the nitrogen-containing substance and the degree of substitution which it is desired to effect. It may for example be up to 5, 10, 15 or 20 hours or more.

On completion of the reaction the nitrogen-containing cellulose derivatives are separated from the reaction medium and may be washed and dried. Nitrogen-containing cellulose derivatives obtained in finely divided form in suspension in the reaction medium may be separated by filtration whilst nitrogen-containing cellulose derivatives formed in solution may be precipitated and then separated from the reaction medium by filtration.

The products of the present invention may be subjected to further treatment. For example any hydroxy groups remaining in the products may be etherified or esterified, whilst any free amino groups contained in the products may be alkylated or acidylated. Suitable etherifying and alkylating agents are, for example, ethyl chloride and benzyl chloride, whilst suitable esterifying or acidylating agents are acid chlorides and acid anhydrides, e. g. acetyl chloride and acetic anhydride. Products containing a nitrile group may be reduced, hydrated or hydrolysed to convert the group into a —CH$_2$NH$_2$, —CONH$_2$ or —COOH group respectively.

Where the nitrogen-containing cellulose derivatives obtained are not already in the form of filaments, yarns, films, foils and similar materials, they may be employed for the manufacture of such materials by extrusion or casting processes. Thus, for example, esters or ethers of cellulose containing non-acidic nitrogen produced according to the present invention may be dissolved in acetone, dioxane or other suitable solvents and extruded through shaping devices into gaseous or liquid setting media.

The nitrogen-containing cellulose derivative materials have a good affinity for acid dyestuffs, while products containing diazotisable amino groups may be diazotised so that dyestuffs may be formed by direct reaction with the products. Further, by using nitrogen-containing reagents containing a primary amino group or two or more reactive nitrogen-containing groups the initial materials may have their resistance to creasing improved.

The following examples illustrate the invention but are not to be regarded as limiting it in any way:

Example 1

100 parts of cotton linters are pretreated in the cold with 3% aqueous solution of hydrochloric acid, washed and then heated in a closed vessel with about 1,000 parts of a concentrated aqueous solution of methylamine and about 2 parts of manganese sulphate. The temperature is maintained at about 150–180° C. for an hour and the vessel is then cooled and the treated cotton linters washed and dried.

Example 2

100 parts by weight of allyl cellulose are heated in a closed vessel with 60–70 parts of methylamine and 2 parts of copper sulphate for half an hour at 50–80° C. The treated allyl cellulose is then separated, washed and dried.

Example 3

100 parts of ethyl cellulose containing about 2–2½ ether groups per C$_6$H$_{10}$O$_5$ molecule are dissolved in a mixture of 400 parts of benzene and about 50 parts of diethylamine. About 2 parts of finely divided thoria are then suspended in the solution and the mixture is then heated in a closed vessel at 100° C. for two hours with constant stirring. After cooling, the solution is filtered to remove the suspended thoria, and the benzene and residual diethylamine removed by evaporation, e. g. by a spray drying process.

Example 4

100 parts of regenerated cellulose filaments are impregnated with a 6% solution of nickel carbonyl in a mixture of alcohol and benzene, pressed until they contain about 100 parts of the solution and then heated in a closed vessel to about 180° C. The filaments, which are thus impregnated with finely divided nickel, are then heated in a closed vessel with anhydrous ammonia vapour for two hours at about 100° C. The filaments are then washed first with dilute acid and then with water and are then dried.

Having described my invention what I desire to secure by Letters Patent is:

1. Process for the production of cellulose derivative materials, which comprises introducing non-acidic nitrogen into cellulosic materials by reacting the materials for at least 30 minutes under super-atmospheric pressure with nitrogen-containing compounds and catalyzing the reaction with a substance containing a metal atom which is capable of forming co-ordination compounds containing nitrogen.

2. Process for the production of cellulose derivative materials, which comprises replacing with basic nitrogen-containing groups hydroxy groups present in halogen-free cellulosic materials by reacting the materials for at least 30 minutes under super-atmospheric pressure with nitrogen-containing compounds and catalyzing the reaction with a substance containing a metal atom which is capable of forming co-ordination compounds containing nitrogen.

3. Process for the production of cellulose derivative materials, which comprises replacing with basic nitrogen-containing groups hydroxy groups present in halogen-free organic derivatives of cellulose which constitute the basis of filaments, yarns, films, foils and similar materials by reacting the materials for at least 30 minutes under super-atmospheric pressure with nitrogen-containing compounds and catalyzing the reaction with a substance containing a metal atom which is capable of forming co-ordination compounds containing nitrogen.

4. Process for the production of cellulose derivative materials, which comprises introducing basic nitrogen-containing groups into halogen-free organic derivatives of cellulose containing unsaturated radicles which constitute the basis of filaments, yarns, films, foils and similar materials by reacting the materials for at least 30 minutes under super-atmospheric pressure with nitrogen-containing compounds and catalyzing the reaction with a substance containing a metal atom which is capable of forming co-ordination compounds containing nitrogen.

5. Process for the production of cellulose derivative materials, which comprises replacing with basic nitrogen-containing groups hydroxy groups present in halogen-free organic derivatives of cellulose which constitute the basis of filaments, yarns, films, foils and similar materials by reacting the materials for at least 30 minutes under super-atmospheric pressure with nitrogen-containing compounds and catalyzing the reaction with a finely divided metal which is capable of forming co-ordination compounds containing nitrogen.

6. Process for the production of cellulose derivative materials, which comprises replacing with basic nitrogen-containing groups hydroxy groups present in halogen-free organic derivatives of cellulose which constitute the basis of filaments, yarns, films, foils and similar materials by reacting the materials for at least 30 minutes under super-atmospheric pressure with nitrogen-containing compounds and catalyzing the reaction with a salt of a metal which is capable of forming co-ordination compounds containing nitrogen.

7. Process for the production of cellulose derivative materials, which comprises introducing non-acidic nitrogen into materials having a basis of cellulose acetate by reacting the materials for at least 30 minutes under super-atmospheric pressure at a temperature exceeding 50° C. with nitrogen-containing compounds and catalyzing the reaction with a substance containing a metal atom which is capable of forming co-ordination compounds containing nitrogen.

8. Process for the production of cellulose derivative materials, which comprises introducing non-acidic nitrogen into materials having a basis of cellulose acetate by reacting the materials for at least 30 minutes under super-atmospheric pressure at a temperature exceeding 50° C. with nitrogen-containing compounds and catalyzing the reaction with a finely divided metal which is capable of forming co-ordination compounds containing nitrogen.

9. Process for the production of cellulose derivative materials which comprises introducing non-acidic nitrogen into materials having a basis of cellulose acetate by reacting the materials for at least 30 minutes under super-atmospheric pressure at a temperature exceeding 50° C. with nitrogen-containing compounds and catalyzing the reaction with a salt of a metal which is capable of forming co-ordination compounds containing nitrogen.

HENRY DREYFUS.

CERTIFICATE OF CORRECTION.

Patent No. 2,186,101. January 9, 1940.

HENRY DREYFUS.

It is hereby certified that error appears in the printed specification of the above numbered patent requiring correction as follows: Page 1, first column, line 27, for the word "non-action" read non-acidic; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.